No. 718,790. PATENTED JAN. 20, 1903.
G. L. PERVIER.
ICE TONGS.
APPLICATION FILED AUG. 13, 1901.
NO MODEL.
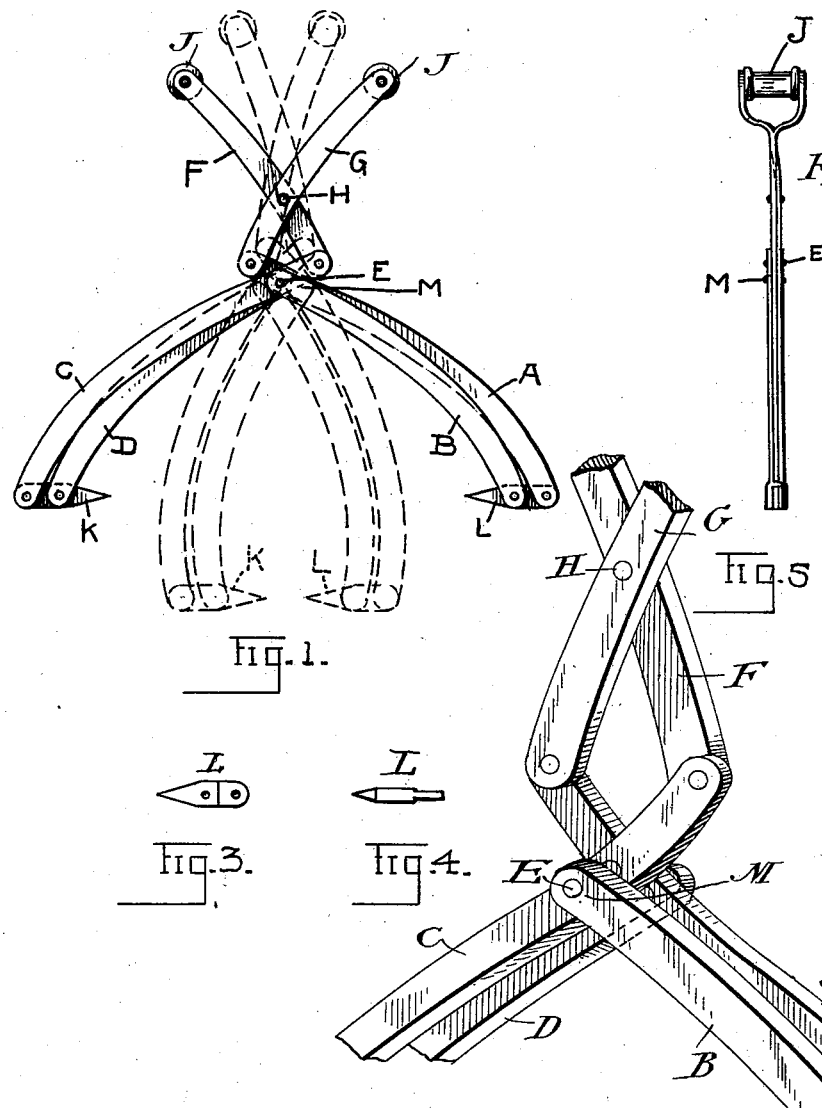

UNITED STATES PATENT OFFICE.

GEORGE L. PERVIER, OF SCHAGHTICOKE, NEW YORK, ASSIGNOR OF ONE-HALF TO BENJAMIN GORDON FARR, OF MECHANICSVILLE, NEW YORK.

ICE-TONGS.

SPECIFICATION forming part of Letters Patent No. 718,790, dated January 20, 1903.

Application filed August 13, 1901. Serial No. 71,956. (No model.)

*To all whom it may concern:*

Be it known that I, GEORGE L. PERVIER, a citizen of the United States of America, and a resident of Schaghticoke, Rensselaer county, New York, have invented certain new and useful Improvements in Ice-Tongs, of which the following is a specification.

My invention relates to devices for engaging, lifting, and carrying various commodities, and especially applicable to the manipulation of cakes of ice; and the object of my invention is to provide a tongs in which the finger or prong adapted to engage with the commodity to be handled shall maintain substantially a horizontal position regardless of the position of the arms to which the fingers or prongs are attached. I attain this object by means of the mechanism illustrated in the accompanying drawings, in which—

Figure 1 is a front elevation; Fig. 2, a side elevation; Fig. 3, a plan of the face of a finger; Fig. 4, a plan of the side of a finger. Fig. 5 is a perspective view of my invention.

Similar letters refer to similar parts throughout the several views.

I arrange four arms A, B, C, and D in pairs, a long arm A and a short arm B on one side of the tongs forming together a compound member, and a long arm C and a short arm D on the opposite side of the tongs forming a compound member. The arms A and B and C and D are pivoted together outside of the center E, as at M. The ends of the arms A and C are connected with the hand-levers G and F, respectively, which are pivoted at H and each of which is preferably provided with a handle J. The ends of the arms A B C D are preferably bifurcated, and the fingers K and L are pivoted, respectively, at the ends of the arms, the finger L being pivoted within the bifurcations at the ends of the arms A and B and the finger K within the bifurcations at the ends of the arms C and D. As thus arranged it is apparent that when the arms carrying the fingers L and K are brought toward each other they will assume the position shown in dotted lines in Fig. 1, the fingers being in substantially the same horizontal plane, and when the arms are separated they will assume the position shown by full lines in Fig. 1, the fingers maintaining substantially a horizontal position. This is accomplished by a long and short arm attached to each finger and the different centers at which they are united. By this arrangement of my device I provide a positive means for engaging an article to be carried, the fingers striking the article at right angles whether the article is large or small. It adjusts itself automatically to the size of the article to be operated on and is so simple that it is easy in operation and inexpensive in construction.

What I claim as my invention, and desire to secure by Letters Patent, is—

In ice-tongs the combination of two pairs of arms, each pair comprising one short and one long arm, said pairs pivoted together near one of their ends; a finger pivoted to each pair; a pair of pivoted handle-levers, a means for connecting said handle-levers to the longer arms of each pair of arms, substantially as described.

Signed at Albany, New York, this 3d day of August, 1901.

GEORGE L. PERVIER.

Witnesses:
FREDERICK W. CAMERON,
LOTTIE PRIOR.